J. H. F. SCHULZE.
TROWEL.
APPLICATION FILED SEPT. 8, 1921.

1,409,789. Patented Mar. 14, 1922.

Inventor
J. H. F. Schulze.

Witness
P. M. Hunt.
N. A. Minnett.

By John Louis Waters & Co.
Attorney

UNITED STATES PATENT OFFICE.

JOHN H. F. SCHULZE, OF JAMAICA, NEW YORK.

TROWEL.

1,409,789.    Specification of Letters Patent.    Patented Mar. 14, 1922.

Application filed September 8, 1921. Serial No. 499,865.

*To all whom it may concern:*

Be it known that JOHN H. F. SCHULZE, a citizen of the United States of America, residing at Jamaica, in the county of Queens and State of New York, has invented new and useful Improvements in Trowels, of which the following is a specification.

The object of the invention is to provide a novel form of connecting shank between the blade and handle of a trowel, whereby the latter may be more readily manipulated by a right-hand mason and a better grip maintained in spreading the mortar and cement; and with this object in view the invention consists in a construction and combination of parts illustrated in the accompanying drawings, in which.

Figure 1:
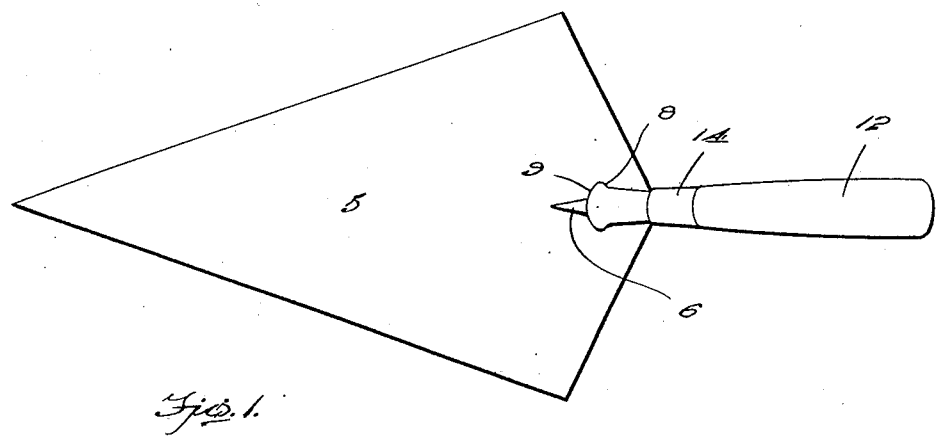
Figure 1 is a top plan view of a trowel made in accordance with the invention.
Figure 2:
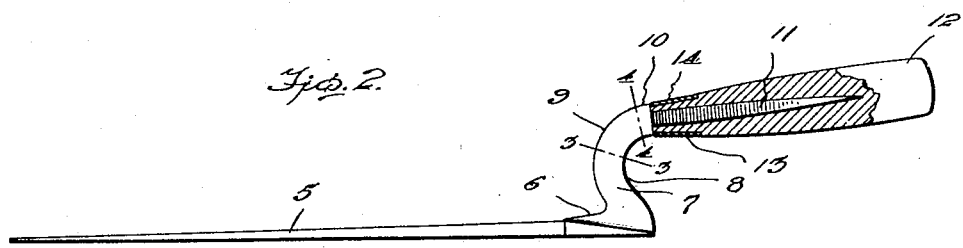
Figure 2 is a side elevational view of the trowel, the handle and a portion of the ferrule thereof being shown in section.
Figure 3:
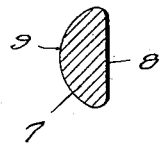
Figure 3 is a section indicated by the line 3—3 of Figure 2.
Figure 4:
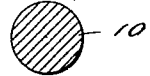
Figure 4 is a section indicated by the line 4—4 of Figure 2.

The blade 5 of the trowel is formed integral with or secured in any suitable manner to the triangular portion 6 of the goose neck shank or connecting member 7, the shank being provided with a flattened finger receiving face portion 8 and the outer transversely curved face 9, as clearly shown in the cross section in Figure 3. As indicated at 10 the shank is circular in cross section and is provided centrally thereof with an outwardly extending tang 11, square in cross section, which penetrates into the handle 12, whose reduced end 13 is surrounded by a ferrule 14 carried by the shank.

In use the tank prevents rotary movement of the handle and owing to the goose neck shank the trowel may be held full of mortar more advantageously than with the straight shank since most of the weight is relieved from the first finger. Also by reason of the fact that the first finger of the user abuts the inner flattened face of the goose neck shank the trowel may be more evenly held in the hand, the formation of the shank consequently permitting of more easy manipulation of the trowel.

Having described the invention, what is claimed as new and useful is:—

In a device of the class described, in combination, a blade, a shank having its bottom portion secured to the inner end of said blade and having its lower portion curving upwardly and inwardly with respect to the innermost point of said blade, said shank having its upper portion curving oppositely of its lower portion and outwardly with respect to the innermost point of the blade, the upper curved portion of the shank being circular in cross section, a handle secured to the shank at the circular portion thereof, the lower portion of said shank also having a rear flat edge and a convex side and front surface merging into its circular surface, the said lower portion of the shank also having an integral back extension inclining downwardly toward the innermost point of the blade, said shank having its lower portion increased in width in a plane at right angles to the extension.

In testimony whereof he affixes his signature.

JOHN H. F. SCHULZE.